(12) United States Patent
Tyler et al.

(10) Patent No.: US 12,335,305 B2
(45) Date of Patent: *Jun. 17, 2025

(54) SYSTEMS AND METHODS FOR DETECTING DOMAIN IMPERSONATION

(71) Applicant: Mimecast Services Ltd., London (GB)

(72) Inventors: Simon Paul Tyler, Wiltshire (GB); Jackie Anne Maylor, Wiltshire (GB); Paul Sowden, London (GB); Meni Farjon, Ramat Gan (IL)

(73) Assignee: Mimecast Services Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,625

(22) Filed: Aug. 22, 2023

(65) Prior Publication Data
US 2024/0064171 A1 Feb. 22, 2024

Related U.S. Application Data

(63) Continuation of application No. 16/134,317, filed on Sep. 18, 2018, now Pat. No. 11,736,521.

(60) Provisional application No. 62/581,860, filed on Nov. 6, 2017.

(51) Int. Cl.
H04L 9/40 (2022.01)
G06F 16/907 (2019.01)
G06F 21/44 (2013.01)
G06F 21/51 (2013.01)
G06F 21/60 (2013.01)
H04L 61/4511 (2022.01)

(52) U.S. Cl.
CPC ........ *H04L 63/1483* (2013.01); *G06F 16/907* (2019.01); *G06F 21/44* (2013.01); *G06F 21/51* (2013.01); *G06F 21/606* (2013.01); *H04L 63/1416* (2013.01); *G06F 2221/2119* (2013.01); *H04L 61/4511* (2022.05)

(58) Field of Classification Search
CPC ............. H04L 63/1483; H04L 63/1416; H04L 61/4511; G06F 16/907; G06F 21/44; G06F 21/51; G06F 21/606; G06F 2221/2119

See application file for complete search history.

(56) References Cited

U.S. PATENT DOCUMENTS

| | | | |
|---|---|---|---|
| 7,559,085 B1 * | 7/2009 | Wahl | H04L 61/30 726/17 |
| 8,990,933 B1 | 3/2015 | Magdalin | |
| 9,332,022 B1 * | 5/2016 | Ashley | H04L 63/1433 |
| 9,762,612 B1 * | 9/2017 | Schiffman | H04L 41/0631 |
| 9,774,626 B1 * | 9/2017 | Himler | H04L 63/1483 |
| 10,721,195 B2 * | 7/2020 | Jakobsson | H04L 51/48 |
| 10,904,286 B1 | 1/2021 | Liu | |
| 11,089,055 B1 | 8/2021 | Sadovyi et al. | |
| 11,146,576 B1 | 10/2021 | Mushtaq | |
| 11,496,510 B1 | 11/2022 | Orhan | |
| 2006/0047958 A1 | 3/2006 | Morais | |

(Continued)

*Primary Examiner* — Techane Gergiso
(74) *Attorney, Agent, or Firm* — Nutter McClennen & Fish LLP

(57) ABSTRACT

The invention is a security system providing domain name authentication for intrusion and malware prevention. The system is configured to analyze domain names, specifically analyze network metadata associated with said domain names, and further identify domain names attempting to impersonate or spoof domain names associated with a trusted entity or party.

18 Claims, 5 Drawing Sheets

(56) References Cited

U.S. PATENT DOCUMENTS

| | | | |
|---|---|---|---|
| 2007/0208940 A1* | 9/2007 | Adelman | G06Q 10/107 713/168 |
| 2008/0010538 A1 | 1/2008 | Satish et al. | |
| 2008/0022013 A1* | 1/2008 | Adelman | H04L 61/4511 709/245 |
| 2008/0034211 A1* | 2/2008 | Shull | H04L 61/4511 713/175 |
| 2008/0307049 A1* | 12/2008 | Curran | H04L 61/4511 709/203 |
| 2009/0119402 A1 | 5/2009 | Shull et al. | |
| 2009/0187992 A1 | 7/2009 | Poston | |
| 2009/0300768 A1* | 12/2009 | Krishnamurthy | H04L 63/1483 726/26 |
| 2010/0235913 A1 | 9/2010 | Craioveanu et al. | |
| 2010/0313266 A1* | 12/2010 | Feng | H04L 67/10 707/E17.014 |
| 2012/0167233 A1* | 6/2012 | Gillum | H04L 51/212 709/206 |
| 2013/0086677 A1* | 4/2013 | Ma | H04L 63/1483 726/22 |
| 2014/0082726 A1* | 3/2014 | Dreller | H04L 51/48 726/23 |
| 2014/0201844 A1 | 7/2014 | Buck | |
| 2014/0259158 A1* | 9/2014 | Brown | H04L 51/08 726/22 |
| 2014/0298460 A1* | 10/2014 | Xue | H04L 63/1425 726/23 |
| 2015/0213131 A1* | 7/2015 | Styler | H04L 61/4511 707/767 |
| 2016/0055490 A1* | 2/2016 | Keren | G06Q 30/00 705/14.47 |
| 2016/0315969 A1* | 10/2016 | Goldstein | H04L 63/0236 |
| 2016/0352772 A1* | 12/2016 | O'Connor | H04L 63/1483 |
| 2017/0034100 A1* | 2/2017 | Zink | H04L 63/123 |
| 2017/0078321 A1* | 3/2017 | Maylor | H04L 63/08 |
| 2017/0099314 A1* | 4/2017 | Klatt | H04L 63/1483 |
| 2017/0126730 A1* | 5/2017 | Oberheide | H04L 63/1483 |
| 2017/0230323 A1* | 8/2017 | Jakobsson | H04L 63/18 |
| 2018/0027013 A1* | 1/2018 | Wright | H04L 61/4511 726/23 |
| 2018/0091478 A1* | 3/2018 | Jakobsson | H04L 63/0254 |
| 2019/0373002 A1 | 12/2019 | Mushtaq | |
| 2020/0036751 A1 | 1/2020 | Kohavi | |
| 2020/0067861 A1* | 2/2020 | Leddy | G06F 21/6245 |
| 2020/0358819 A1 | 11/2020 | Bowditch et al. | |
| 2021/0026977 A1 | 1/2021 | Shivakumar et al. | |
| 2021/0037006 A1 | 2/2021 | Belenko | |
| 2021/0149957 A1 | 5/2021 | Grossman et al. | |
| 2021/0320946 A1 | 10/2021 | Boshmaf et al. | |
| 2022/0174092 A1 | 6/2022 | Farjon et al. | |

* cited by examiner

SYSTEMS AND METHODS FOR DETECTING DOMAIN IMPERSONATION

CROSS-REFERENCE TO RELATED APPLICATIONS

This application is a continuation of, and claims priority to, U.S. patent application Ser. No. 16/134,317, filed Sep. 18, 2018 (U.S. Pat. No. 11,736,521 issued Aug. 22, 2022), which claims the benefit of, and priority to, U.S. Provisional Application No. 62/581,860, filed Nov. 6, 2017, the content of each of which is hereby incorporated by reference herein in its entirety.

FIELD

The present disclosure relates generally to the field of communication networks, and, more particularly, to Internet security systems and methods, including, but not limited to, systems and methods for intrusion detection, including detection of phishing and impersonation, malware prevention, and domain authentication.

BACKGROUND

The Internet is the global system of interconnected computer networks, consisting of private, public, academic, business, and government networks of local to global scope, linked by a broad array of electronic, wireless, and optical networking technologies. The Internet carries a vast range of information resources and services, and is a critical part of the communications infrastructure of the world. However, the Internet also represents an insecure channel for exchanging information leading to a high risk of intrusion or fraud. As such, it is important for individual users and enterprises to utilize some form of Internet security in order to decrease the risk of data breaches as a result of such threats.

One type of threat involves a form of domain name impersonation or masquerading. For example, by way of background, interconnected computers exchange information using various services, such as electronic mail, Gopher, and the World Wide Web ("WWW"). The WWW service allows a server computer system (i.e., Web server or Website) to send graphical Web pages of information to a remote client computer system. The remote client computer system can then display the Web pages. Each resource (e.g., computer or Web page) of the WWW is uniquely identifiable by a Uniform Resource Locator ("URL"). In order to view a specific Web page, a client computer system specifies the URL for the Web page in a request (e.g., a HyperText Transfer Protocol ("HTTP") request), which generally follow the familiar format http://www.xxx.com, uniquely identifying the particular resource. The request is then forwarded to the Web server that supports that Web page to the client computer system. Upon receiving the web page, the client computer system displays the Web page using a browser. Generally, a Web page's address or URL is made up of the name of the server along with the path to the file or the server. Rather than using a Web hosting service's server name as their URL, most companies and many individuals and other entities prefer a "domain name" of their own choosing. In other words, Google would likely prefer its Google Web Search engine to have the domain name of "http://www.google.com" as its URL rather than, "http://servername.com/~google", where "servername" is the name of a Web hosting service whose server Google uses.

Malicious actors on the Internet often try to fool users into thinking that they are interacting with known, trusted entities. When a malicious actor garners some amount of trust from the user, such trust may be exploited to the detriment of the user. For example, domain name impersonation or masquerading is a technique in which a domain name of a trusted entity, which would normally direct to a legitimate and trusted Web page or content, has been altered in such a manner that an internet user can be fooled into believing that the altered domain name is associated with the trusted entity. However, clicking the altered domain name may instead cause downloading of software (or allow other forms of entry) that is of malicious intent, such as phishing, online viruses, Trojan horses, worms, and the like.

For example, a domain name may be altered by one or more characters, but may still visually appear to be associated with the trusted party, thereby tricking an internet user into believing that it is authentic. A user is more likely to click on an altered link if said user believes that the link is associated with a trusted party. For example, the domain name "www.citibank.com" may be altered by one or more characters to form a masquerading domain name, such as "www.citlbank.com", and may invite trust from a customer of the trusted party (i.e., Citibank), despite the change of the "i" to a "l" in the domain name. Similarly, email falsely purporting to be from Mimecast (the trusted company) will be more believable with a return address of "@mrncast.com", than with a generic "@yahoo.com". Additionally, a masquerading domain name may use the correct characters or word of the trusted domain name, but may include such characters or words in a different order, such as, for example, "mimecast.nl", which is not registered or associated with the trusted entity. The detection of such subtleties in domain names can be especially difficult, thereby presenting a challenge for current security systems.

SUMMARY

The present invention is directed to security systems and methods providing domain name authentication for intrusion and malware prevention.

As generally understood, domain names serve to identify Internet resources, such as computers, networks, and services, with a text-based label that is easier to memorize and more stable over time than the numerical addresses used in the Internet protocols. A domain name may represent entire collections of such resources or individual instances. Individual Internet host computers use domain names as host identifiers, also called host names. The term host name is also used for the leaf labels in the domain name system, usually without further subordinate domain name space. Host names appear as a component in Uniform Resource Locators (URLs) for Internet resources such as websites. Domain names are also used as simple identification labels to indicate ownership or control of a resource. Such examples are the realm identifiers used in the Session Initiation Protocol (SIP), DomainKeys Identified Mail (DKIM) Domain Keys used to verify DNS domains in e-mail systems, and in many other Uniform Resource Identifiers (URIs), as well as cryptographic protocols that provide communications security over a computer network, including, but not limited to, Secure Sockets Layer (SSL), Transport Layer Security (TLS), other cryptographic certificates.

Domain names are formed by the rules and procedures of the Domain Name System (DNS). Any name registered in the DNS is a domain name. Domain names are used in various networking contexts and for application-specific naming and addressing purposes. In general, a domain name represents an Internet Protocol (IP) resource, such as a personal computer used to access the Internet, a server computer hosting a website, or the website itself or any other service communicated via the Internet.

An important function of domain names is to provide easily recognizable and memorable names to numerically addressed Internet resources. This abstraction allows any resource to be moved to a different physical location in the address topology of the network, globally or locally in an intranet. Such a move usually requires changing the IP address of a resource and the corresponding translation of this IP address to and from its domain name. Domain names are used to establish a unique identity. Entities, such as organizations, can choose a domain name that corresponds to their name, helping Internet users to reach them easily.

Some security systems may utilize current techniques to deal with domain name security issues, such as, for example, blacklists, whitelists, and loose matching of domain names to a list of trusted domains. Known systems and methods generally check for domain name impersonation by way of seeking visual similarities between a domain name in question and a known list of trusted domain names, which is particularly useful in identifying domain names that have been altered by way of deceptive character use. For example, as previously noted, some masquerading domain names include a majority of characters from a normally trusted domain name, while some of the characters have been altered, such that the masquerading domain name as a whole visually appears to be associated with the trusted party.

The introduction of Unicode domain names, however, has made the task of detecting of masquerading domain names increasingly more difficult, particularly for security systems that rely on visual comparisons. Unicode is a computing industry standard for the consistent encoding, representation, and handling of text expressed in most of the world's writing systems. Unicode domains can be problematic because many Unicode characters are difficult to distinguish from common ASCII characters. Unicode domains has led to homograph and homoglyph attacks. In particular, it is possible for a malicious actor register domains such as "xn—pple-43d.com", which when displayed is visually equivalent to "apple.com", in an attempt to fool a user into clicking on the masquerading domain name. A homograph attack is a method of deception wherein a threat actor leverages on the similarities of character scripts to create and register phony domains of existing ones to fool users and lure them into visiting. This attack has some known aliases: homoglyph attack, script spoofing, and homograph domain name spoofing. Characters—i.e., letters and numbers—that look alike are called homoglyphs or homographs, thus the name of the attack. Examples of such are the Latin small letter "o" (U+006F) and the Digit zero "o" (U+0030). Furthermore, current security systems relying on visual similarity techniques have difficulty in detecting masquerading domain names that may use the correct characters or words of the trusted domain name in the wrong order or placement of the domain.

The present invention is directed to an internet security system configured to identify domain names designed to fool a user into thinking that such domain names are tied to, or otherwise associated with, trusted entities or parties. In particular, the internet security system provides improved domain name authentication by analyzing a domain name, specifically DNS metadata associated with the domain name, in order to determine whether the domain name is legitimate, and thus directs a user to a trusted Web page or content, or if the domain name has been created with the intent to impersonate a legitimate domain name and thus fool the user into believing that the masquerading domain name is associated with a trusted entity or party. The system is configured to analyze most, if not all, DNS metadata provided by the DNS system for a given domain under inspection, including, but not limited to, the registrar of the domain, the IP addresses of Mail Exchanger (MX) records, DomainKeys Identified Mail (DKIM) records, and other service addresses beyond Simple Mail Transfer Protocol (SMTP), Internet Message Access Protocol (IMAP), and Post Office Protocol (POP). The system is further configured to utilize other data associated with the domain name under inspection, such as behavioral attributes of the trusted entity or party, including, but not limited to, server software in use and policies the entity or party enforces. For example, WHOIS, the query and response protocol, may be widely used for querying databases that store the registered users or assignees of an Internet resource, such as a domain name, an IP address block or an autonomous system.

BRIEF DESCRIPTION OF THE DRAWINGS

Features and advantages of the claimed subject matter will be apparent from the following detailed description of embodiments consistent therewith, which description should be considered with reference to the accompanying drawings.

Figure 1:
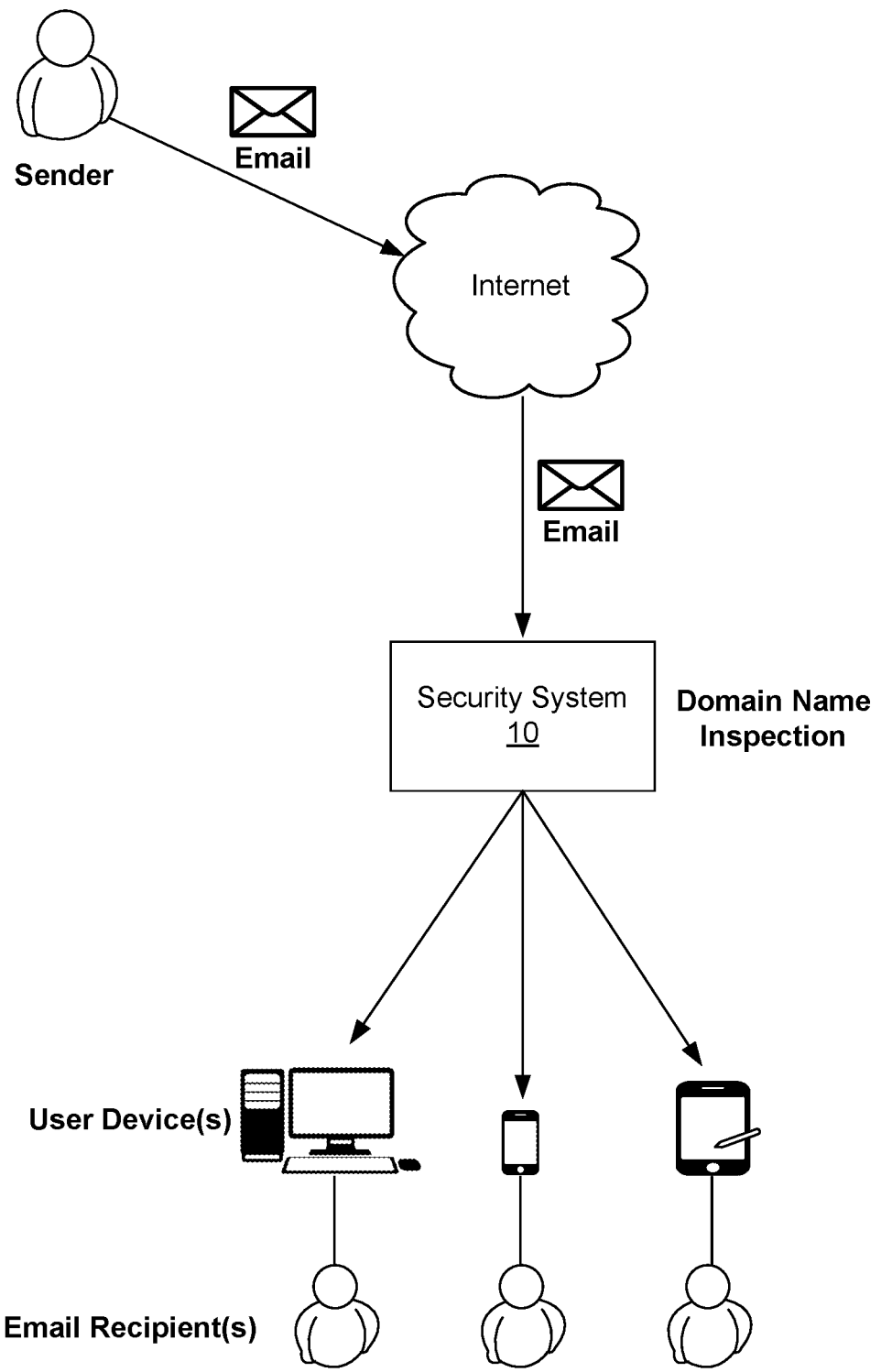
FIG. 1 is a block diagram illustrating a security system consistent with the present disclosure.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present disclosure is generally directed to a security system providing domain name authentication for intrusion and malware prevention. The system is configured to inspect messages, such as email messages, and further analyze the domain names associated therewith, specifically analyze network metadata associated with said domain names in order to determine correlation between the domain of a message under inspection and a well-known target domain (e.g., trusted domain) in order to further determine the legitimacy of the message under inspection. As such, the system is configured to identify domain names attempting to impersonate or spoof domain names associated with a trusted entity or party and prevent the associated messages from being delivered to intended recipients, thereby preventing intrusion and reducing the threat of malware attacks.

As generally understood, domain names serve to identify Internet resources, such as computers, networks, and services, with a text-based label that is easier to memorize than the numerical addresses used in the Internet protocols. A domain name may represent entire collections of such resources or individual instances. Individual Internet host computers may use domain names as host identifiers, also called host names. The term host name is also used for the leaf labels in the domain name system, usually without further subordinate domain name space. Host names appear as a component in Uniform Resource Locators (URLs) for Internet resources such as websites. Domain names are also used as simple identification labels to indicate ownership or control of a resource. Such examples are the realm identifiers used in the Session Initiation Protocol (SIP), the DKIM Domain Keys used to verify DNS domains in e-mail systems, and in many other Uniform Resource Identifiers (URIs).

Domain names are formed by the rules and procedures of the Domain Name System (DNS). Any name registered in the DNS is a domain name. Domain names are used in various networking contexts and for application-specific naming and addressing purposes. In general, a domain name represents an Internet Protocol (IP) resource, such as a personal computer used to access the Internet, a server computer hosting a website, or the website itself or any other service communicated via the Internet.

An important function of domain names is to provide easily recognizable and memorable names to numerically addressed Internet resources. This abstraction allows any resource to be moved to a different physical location in the address topology of the network, globally or locally in an intranet. Such a move usually requires changing the IP address of a resource and the corresponding translation of this IP address to and from its domain name. Domain names are used to establish a unique identity. Entities, such as organizations, can choose a domain name that corresponds to their name, helping Internet users to reach them easily.

Malicious actors on the Internet often try to fool users into thinking that they are interacting with known, trusted entities. When a malicious actor garners some amount of trust from the user, such trust may be exploited to the detriment of the user. For example, domain name impersonation or masquerading is a technique in which a domain name of a trusted entity, which would normally direct to a legitimate and trusted Web page or content, has been altered in such a manner that an internet user can be fooled into believing that the altered domain name is associated with the trusted entity. However, clicking the altered domain name may instead cause downloading of software (or allow other forms of entry) that is of malicious intent, such as phishing, online viruses, Trojan horses, worms, and the like.

For example, a domain name may be altered by one or more characters, but may still visually appear to be associated with the trusted party, thereby tricking an internet user into believing that it is authentic. A user is more likely to click on an altered link if said user believes that the link is associated with a trusted party. For example, the domain name "www.citibank.com" may be altered by one or more characters to form a masquerading domain name, such as "www.citlbank.com", and may invite trust from a customer of the trusted party (i.e., Citibank), despite the change of the "i" to a "1" in the domain name. Similarly, email falsely purporting to be from Mimecast (the trusted company) will be more believable with a return address of "@mrncast.com", than with a generic "@yahoo.com". Additionally, a masquerading domain name may use the correct characters or word of the trusted domain name, but may include such characters or words in a different order, such as, for example, "mimecast.nl", "mime-cast.com", "mimecast-labs.com", or "mimecast.x.com", each of which is not registered or associated with the trusted entity. The detection of such subtleties in domain names can be especially difficult, thereby presenting a challenge for current security systems.

Some security systems may utilize current techniques to deal with domain name security issues, such as, for example, blacklists, whitelists, and loose matching of domain names to a list of trusted domains. Known systems and methods generally check for domain name impersonation by way of seeking visual similarities between a domain name in question and a known list of trusted domain names, which is particularly useful in identifying domain names that have been altered by way of deceptive character use. For example, as previously noted, some masquerading domain names include a majority of characters from a normally trusted domain name, while some of the characters have been altered, such that the masquerading domain name as a whole visually appears to be associated with the trusted party.

The introduction of Unicode domain names, however, has made the task of detecting of masquerading domain names increasingly more difficult, particularly for security systems that rely on visual comparisons. Unicode is a computing industry standard for the consistent encoding, representation, and handling of text expressed in most of the world's writing systems. Unicode domains can be problematic because many Unicode characters are difficult to distinguish from common ASCII characters. Unicode domains has led to homograph and homoglyph attacks. In particular, it is possible for a malicious actor register domains such as "xn—pple-43d.com", which when displayed is visually equivalent to "apple.com", in an attempt to fool a user into clicking on the masquerading domain name. A homograph attack is a method of deception wherein a threat actor leverages on the similarities of character scripts to create and register phony domains of existing ones to fool users and lure them into visiting. This attack has some known aliases: homoglyph attack, script spoofing, and homograph domain name spoofing. Characters—i.e., letters and numbers—that look alike are called homoglyphs or homographs, thus the name of the attack. Examples of such are the Latin small letter "o" (U+006F) and the Digit zero "o" (U+0030). Furthermore, current security systems relying on visual similarity techniques have difficulty in detecting masquerading domain names that may use the correct characters or words of the trusted domain name in the wrong order or placement of the domain.

FIG. 1 is a block diagram illustrating a security system 10 consistent with the present disclosure. The internet security system 10 is configured to identify domain names designed to fool a user into thinking that such domain names are tied to, or otherwise associated with, trusted entities or parties. In particular, the internet security system 10 provides improved domain name authentication by analyzing a domain name associated with a message intended for receipt by one or more recipients. For example, the message may be an email message from a sender to one or more email recipients. The system 10 is configured to receive and inspect the email message, specifically analyzing the domain associated with the email message in order to determine whether the domain is authentic and associated with a trusted entity or party (i.e., determine legitimacy of the domain to ensure that said email message does not contain a threat).

The system 10 of the present invention may be embodied anywhere a domain name is available for inspection. In particular, this may include, but is not limited to, email gateways configured to block masquerading email sources, email readers or web browsers inspecting links that are presented to the user, and the like. The system 10 of the present invention may also be embodied in web proxies, or in servers, relays, or proxies for any end-user facing service, such as chat, telephony, video communication, and social networking systems.

As will be described in greater detail herein, the system 10 is configured to analyze DNS metadata associated with the domain name in order to determine whether the domain name is legitimate, and thus directs a user to a trusted Web page or content, or if the domain name has been created with the intent to impersonate a legitimate domain name and thus fool the user into believing that the masquerading domain name is associated with a trusted entity or party. The system 10 is configured to analyze most, if not all, DNS metadata provided by a DNS system, for example, for a given domain under inspection, including, but not limited to, the registrar of the domain, the IP addresses of Mail Exchanger (MX) records, DomainKeys Identified Mail (DKIM) records, and other service addresses beyond Simple Mail Transfer Protocol (SMTP), Internet Message Access Protocol (IMAP), and Post Office Protocol (POP). The system 10 is further configured to utilize other data associated with the domain name under inspection, such as behavioral attributes of the trusted entity or party, including, but not limited to, server software in use and policies the entity or party enforces.

Figure 2A:
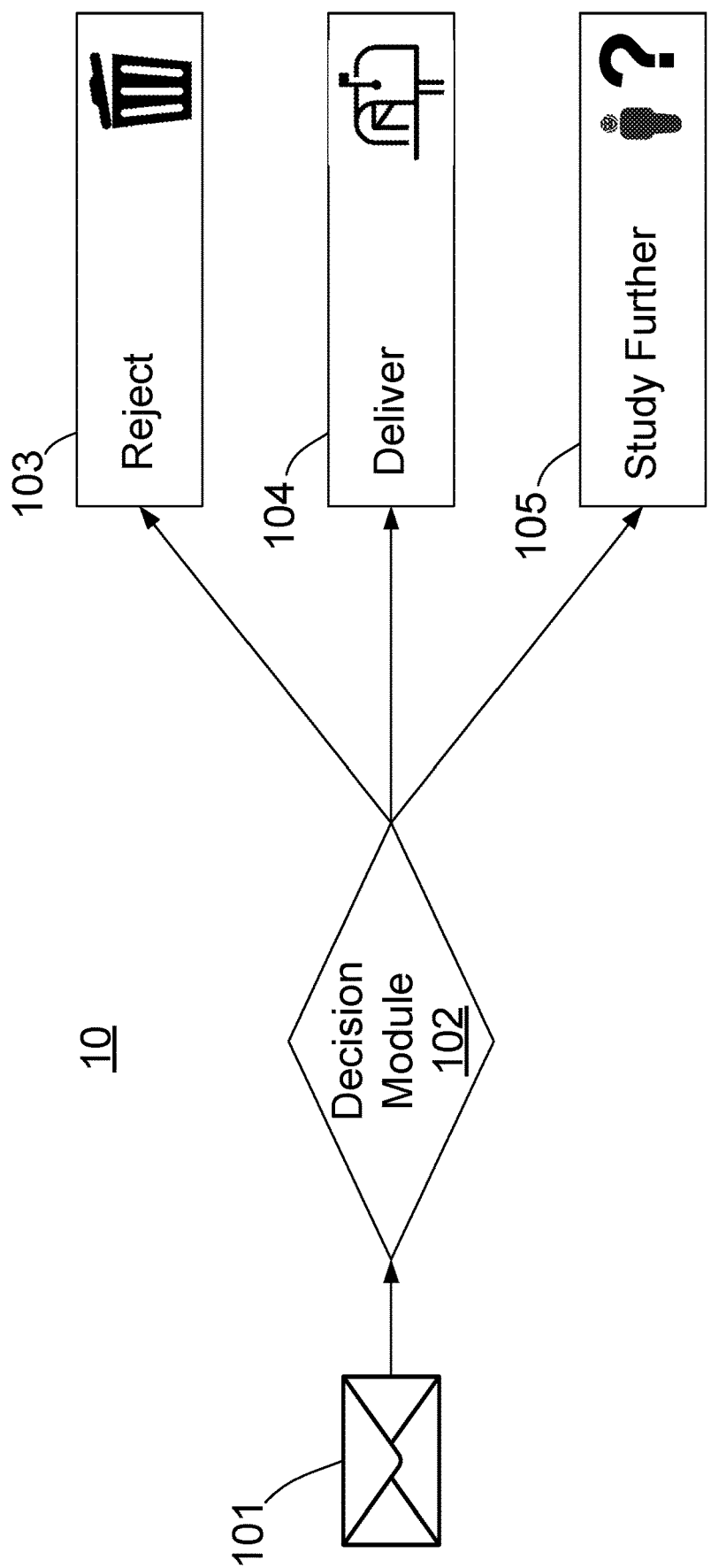
FIG. 2A is a flow diagram illustrating a decision module of the security system for determining whether an email message is authentic upon analysis of the domain associated therewith.

FIG. 2A is a flow diagram illustrating a decision module of the security system for determining whether an email message is authentic upon analysis of the domain associated therewith. As shown, message 101 is provided to a decision module 102, which either rejects the message (103) (because the domain was determined to be unsafe and illegitimate), delivers the message to the intended recipient (104) (because the domain was determined to be legitimate), or flags the message for further review/study (105) (because the determination was initially inconclusive).

Figure 2B:
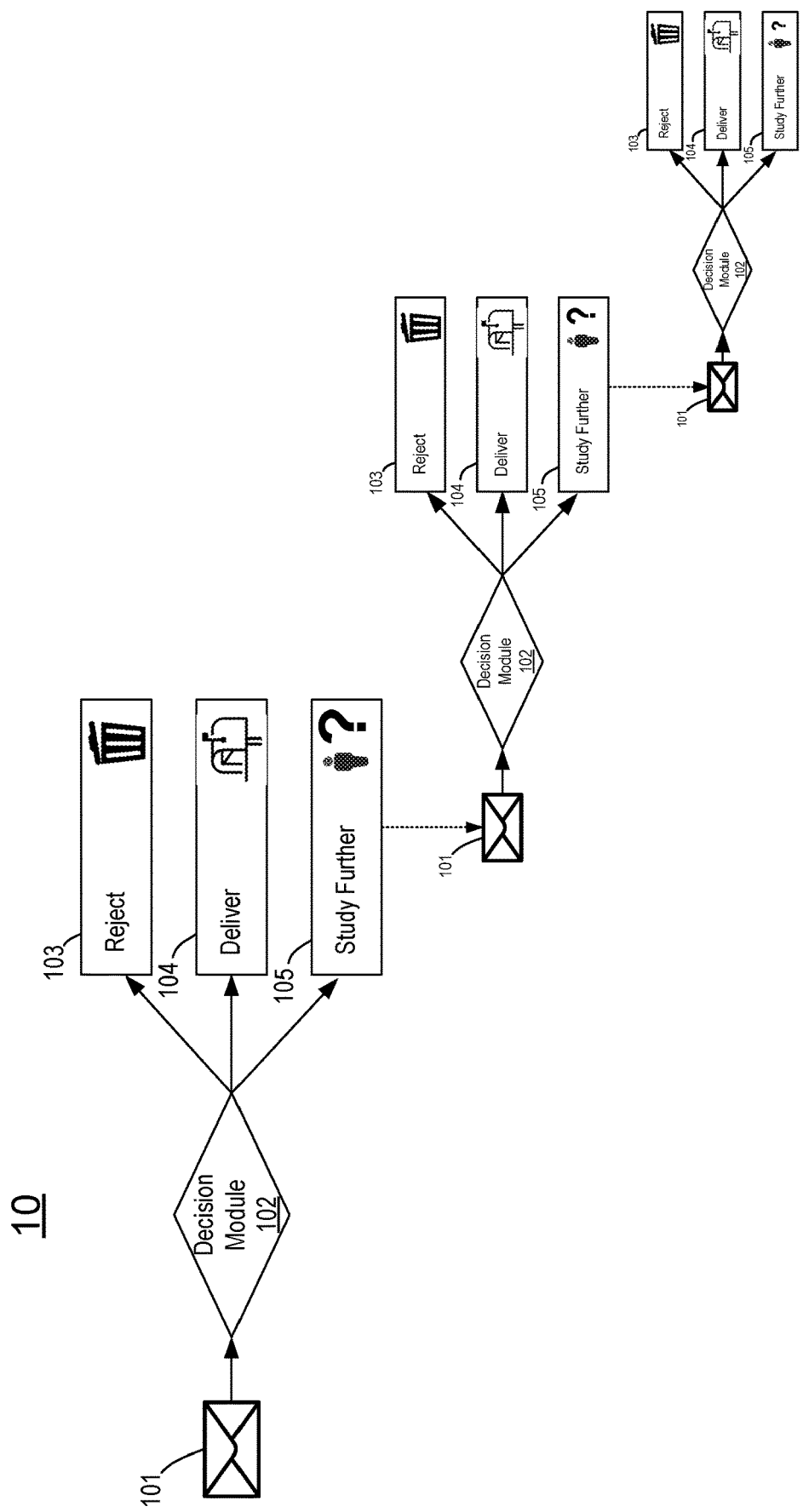
FIG. 2B illustrates the flow diagram of FIG. 2A embedded in an indefinite chain of similar decision modules.

FIG. 2B illustrates the flow diagram of FIG. 2A embedded in an indefinite chain of similar decision modules. As shown, in one implementation, a chain of decision modules make multiple checks on an email message, with messages potentially rejected or delivered at any stage, in the event that the determination of legitimacy of the domain is inconclusive.

Figure 3:
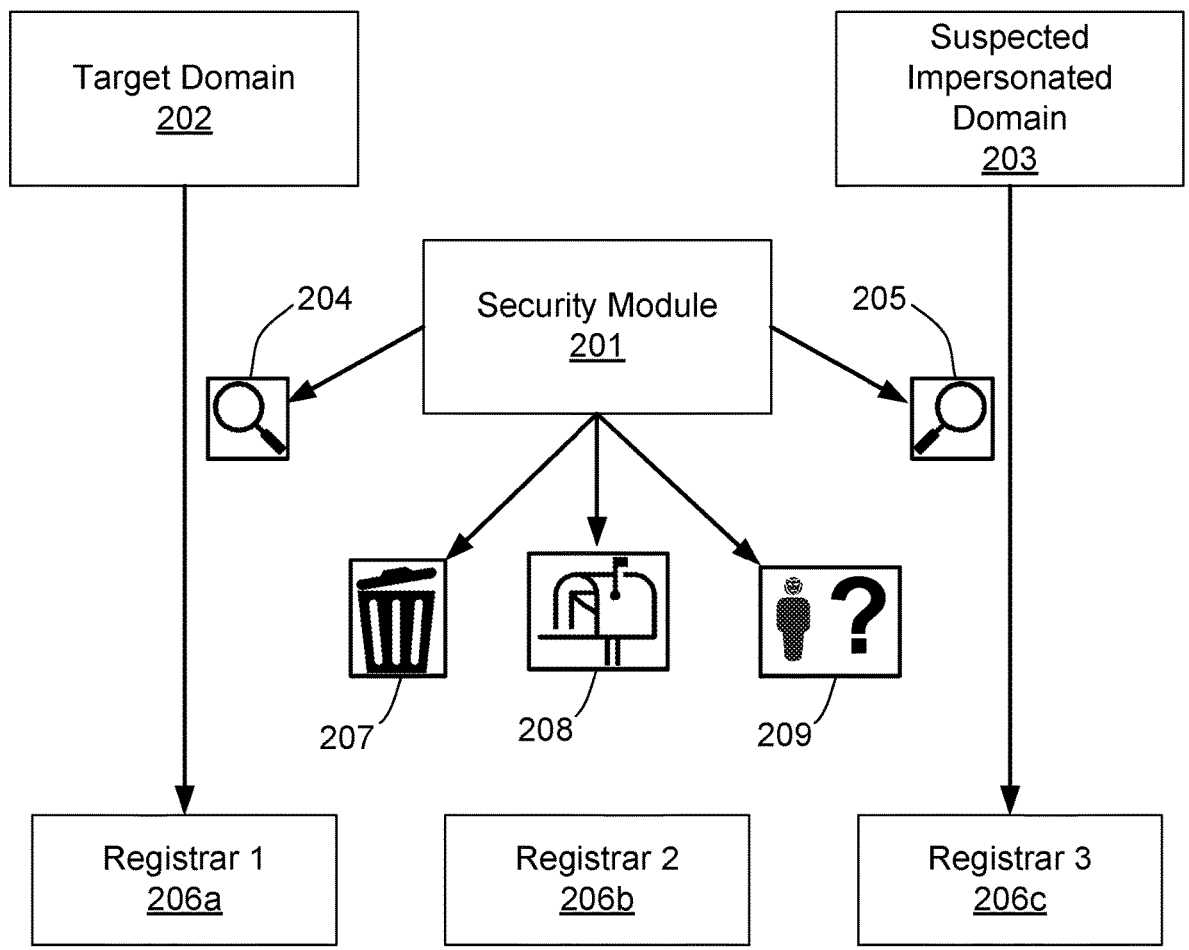
FIG. 3 is a block diagram illustrating various components of the security system of the present disclosure, including a security module for analyzing the email message, specifically determining a correlation between the domain of the email message under inspection and a well-known target domain (e.g., trusted domain) in order to further determine the legitimacy of the email message under inspection.

FIG. 3 is a block diagram illustrating various components of the security system of the present disclosure, including a security module for analyzing the email message, specifically determining a correlation between the domain of the email message under inspection and a well-known target domain (e.g., trusted domain) in order to further determine the legitimacy of the email message under inspection. FIG. 3 generally illustrates a decision module based on inspection of domain registrar information with a security module 201 comparing the domain of the message being examined (referred to as the "suspect domain") with a well-known target domain. It should be noted that, as an initial step, the system is configured to compare the suspect domain with a plurality of known and trusted domains (i.e., "target domains"). The system is further configured to determine a level of resemblance between the suspect domain and one or more of the trusted domains based on the comparison. In the event that there is a positive level of resemblance between the domain name and one or more of the plurality of trusted domains, then analysis of the suspect domain name begins. Accordingly, rather than analyze metadata between the suspect domain and all of the trusted domains, which can be somewhat time consuming, the system of the present disclosure performs an initial review of the suspect domain and the plurality of trusted domains to identify potential trusted domain candidates, at which point the deeper analysis, involving comparison of metadata, between the suspect domain and trusted domain matches can take place.

Both the target domain(s) 202 and the suspect domain 203, by necessity, register certain information, specifically DNS metadata 204, 205, respectively, with a domain registrar 206a, 206b, 206c. If the suspect is a poor match with the target domain, the domain and associated message are flagged as being highly suspect. After examining the domains, the security module 201 is configured to either reject the message 207, delivers the message 208, or flags the message for further study 209.

Signs of masquerading domains can include any of the network configuration information that users generally don't see, including the WHOIS database, the ISP in use, the country in which the server resides (for companies that aren't highly international), inconsistencies in the information available from the nameserver (e.g. DKIM or SPF information) and more. Any of these can be used as clues to flag a potentially masquerading domain.

Figure 4:
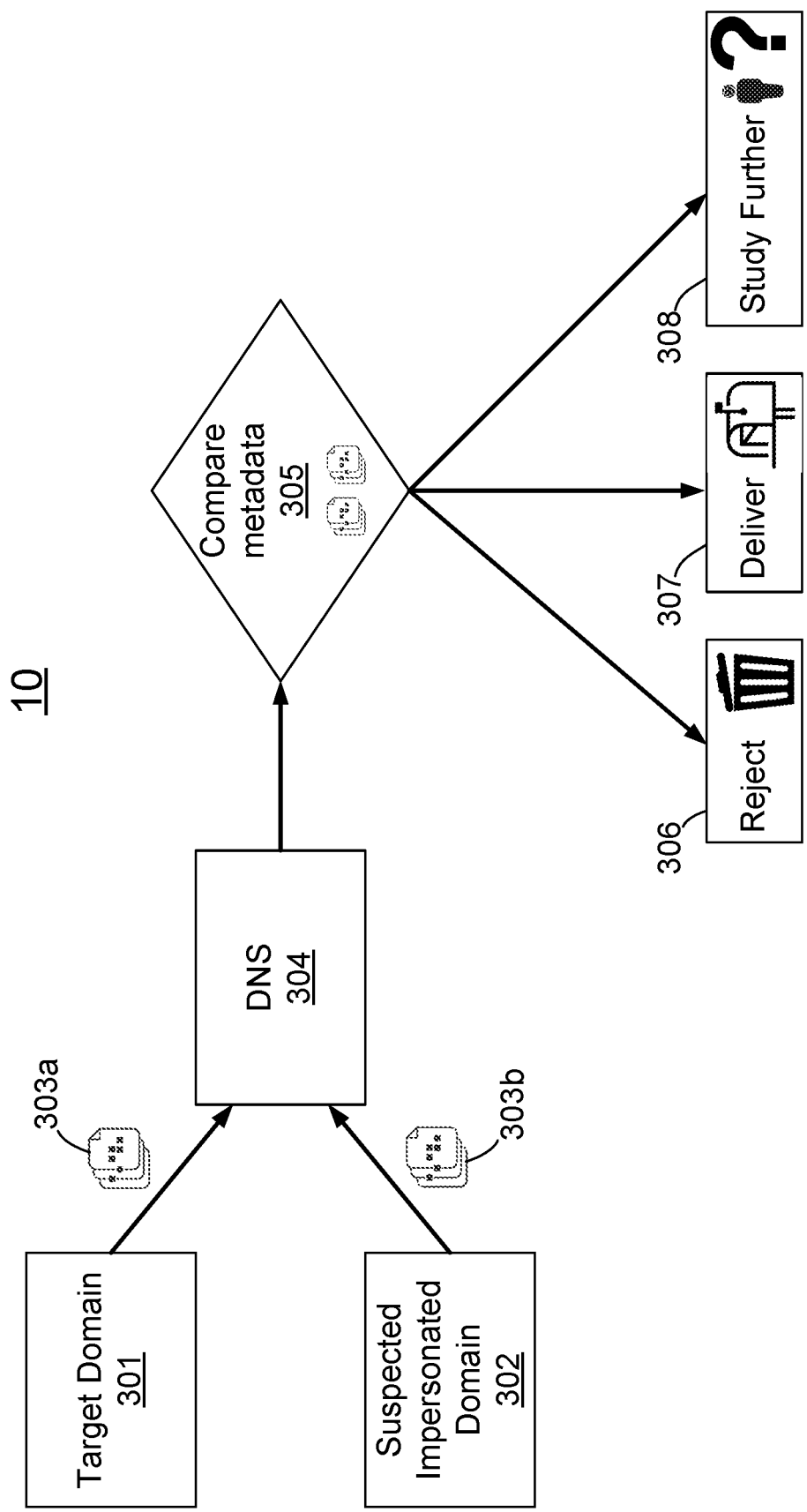
FIG. 4 is a flow diagram illustrating a decision module of the security system for determining whether an email message is authentic upon inspection of the domain based, at least in part, on metadata stored in a Domain Name System (DNS).

For example, FIG. 4 is a flow diagram illustrating a decision module of the security system for determining whether an email message is authentic upon inspection of the domain based, at least in part, on metadata stored in a Domain Name System (DNS). For example, most companies register all of their domains with a single registrar, or serve as their own registrar. In either case, there are only a small number of registrars, and this can be used to identify questionable domains. For example, if "Mimecast.x.com" uses a different registrar than the Mimecast domains do, it is likely an attempt to fool someone. Similarly, the contents of a DNS record may hold similar clues. If a company has a DKIM or SPF record, it is likely to be consistent throughout the company, so a different DKIM or SPF record would be another red flag. Even the A and MX records are likely to differ if the attacker isn't careful enough. The system is further configured to utilize other data associated with the domain name under inspection, such as behavioral attributes of the trusted entity or party, including, but not limited to, server software in use and policies the entity or party enforces. It should further be noted that a URL Category database, a public database that categorizes domains, may be utilized by the systems and methods of the present disclosure in the determination of domain impersonation. In fact, any database of information about domains could be used.

As previously described herein, the system 10, specifically the security module, is configured to analyze most, if not all, DNS metadata provided by the DNS system for a given domain under inspection, including, but not limited to, the registrar of the domain, the IP addresses of Mail Exchanger (MX) records, DomainKeys Identified Mail (DKIM) records, and other service addresses beyond Simple Mail Transfer Protocol (SMTP), Internet Message Access Protocol (IMAP), and Post Office Protocol (POP).

For example, the domain "Mimecast.guppylake.com" might fool some users. In this example, guppylake.com has set up a domain, Mimecast.guppylake.com, designed to fool Mimecast users. A simple inspection of the network domain records is enough to raise multiple red flags:

```
% nslookup
> set type=mx
> mimecast.guppylake.com
Non-authoritative answer:
*** Can't find mimecast.guppylake.com: No answer
Authoritative answers can be found from:
guppylake.com
    origin = ns1.dotster.com
    mail addr = dnsadmin.dotster.com
    serial = 2012071750
    refresh = 10800
    retry = 3600
    expire = 604800
    minimum = 3600
> mimecast.com
Non-authoritative answer:
mimecast.com mail exchanger = 10 service-alpha-inbound-b.mimecast. com.
mimecast.com mail exchanger = 10 service-alpha-inbound-a.mimecast.com.
%
```

In this example, both the registrars and the contents of the DNS record are indication for concern.

The search for such anomalies can be triggered by similarities between the suspect domain and a list of trusted, high-value domains, by unexpected content such as obscenity in mail from a bank, or by other means. Mail from "guppylake.com" or "mimecast.com" would not likely need this kind of comparative inspection, but mail from "mimecast.guppylake.com" would require such comparative inspection. Additionally, a domain of "guppylake.mimecast.com" would require comparative inspection if "guppylake" were considered a high-value domain.

Furthermore, domains that share a common set of nameservers can be assumed to be related. For example, CompanyX owns domains that all use CompanyX-owned nameservers and no other entities use CompanyX-owned nameservers. Therefore, any domain using CompanyX nameservers is known to be owned by CompanyX, and thus trusted. It should further be noted that, in some instances, CompanyX may use nameservers that are also used by other companies. Thus, a match for the nameserver may be a positive indication that the domain under investigation may be safe, but is not conclusive proof that the domain belongs to CompanyX, and thus requires further assurances. With regard to cloud nameservers, CompanyX may include all of its domains within the cloud, and the systems and methods of the present disclosure may provide impersonation detection of a given domain if it is determined that the domain is hosted by a different cloud provider than what is registered to CompanyX.

The system of the present invention addresses the drawbacks of current security systems in that the system of the present invention does not rely solely on visual comparisons of character sets or word combinations. Rather, the system of the present invention is configured to inspect messages, such as email messages, and further analyze the domain names associated therewith, specifically the network metadata associated with said domain names, in order to determine correlation between the domain of a message under inspection and a well-known target domain (e.g., trusted domain) in order to further determine the legitimacy of the message under inspection. As such, the system is configured to identify domain names attempting to impersonate or spoof domain names associated with a trusted entity or party and prevent the associated messages from being delivered to intended recipients, thereby preventing intrusion and reducing the threat of malware attacks.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for domain name authentication, the system comprising:
   at least one processor coupled to at least one memory containing instructions executable by the at least one processor to cause the system to:
   maintain a database with a plurality of trusted domains;
   analyze a domain, wherein analysis of the domain comprises comparing the domain with one or more of the plurality of trusted domains;
   determine that the domain is similar but not identical to at least one of the trusted domains based on the comparison of the domain with one or more of the plurality of trusted domains;
   determine a set of nameservers associated with the domain;
   determine a set of nameservers associated with the at least one trusted domain that is similar but not identical to the domain;
   determine if there is a match between the set of nameservers associated with the domain and the set of nameservers associated with the at least one trusted domain, wherein determining if there is a match between the set of nameservers associated with the domain and the set of nameservers associated with the at least one trusted domain comprises determining if the domain and the at least one trusted domain share a common set of nameservers; and
   flag the domain as being legitimate or flag the domain as being illegitimate based on whether there is a match between the set of nameservers associated with the domain and the set of nameservers associated with the at least one trusted domain.

2. The system of claim 1, wherein the domain is associated with an undelivered message intended to be delivered to a recipient.

3. The system of claim 1, wherein the domain is associated with a received email message, and wherein the system flags the domain name as being legitimate and the email message as safe or flags the domain name as being illegitimate and the email message as potentially harmful based on whether there is a match between the set of nameservers associated with the domain and the set of nameservers associated with the at least one trusted domain.

4. The system of claim 3, wherein the domain is associated with a sender of the email message.

5. The system of claim 1, wherein determining that the domain is similar but not identical to at least one of the trusted domains based on the comparison of the domain with one or more of the plurality of trusted domains comprises:
   determining that there is a positive level of resemblance between the domain and the one or more similar but not identical trusted domains of the plurality of trusted domains.

6. The system of claim 1, wherein the domain is an unrecognized domain associated with a website, and wherein the system flags the domain as being legitimate and the website as safe or flags the domain as being illegitimate and the website as potentially dangerous based on whether there is a match between the set of nameservers associated with the domain and the set of nameservers associated with the at least one trusted domain.

7. The system of claim 1, wherein the instructions further cause the system to:
   determine an identity of a registrar for the domain and an identity of a registrar for the at least one of the trusted domains that are similar but not identical to the domain from the at least one domain registration system;
   compare the identity of the registrar for the domain with the identity of the registrar for the at least one of the trusted domains that are similar but not identical to the domain; and
   flag the domain as being legitimate or flag the domain as being illegitimate based on whether the identity of the registrar for the domain is the same as or different than the identity of the registrar for the at least one of the trusted domains that are similar but not identical to the domain.

8. The system of claim 1, wherein the instructions further cause the system to:
   determine an identity of a host for the domain and an identity of a host for the at least one of the trusted domains that are similar but not identical to the domain from the at least one domain registration system;
   compare the identity of the host for the domain with the identity of the host for the at least one of the trusted domains that are similar but not identical to the domain; and
   flag the domain as being legitimate or flag the domain as being illegitimate based on whether the identity of the host for the domain is the same as or different than the identity of the host for the at least one of the trusted domains that are similar but not identical to the domain.

9. The system of claim 1, wherein at least one nameserver is a cloud nameserver.

10. A method for domain name authentication, the method implemented by a computer security system and comprising:
    maintaining a database with a plurality of trusted domains;

analyzing a domain, wherein analysis of the domain comprises comparing the domain with one or more of the plurality of trusted domains;

determining that the domain is similar but not identical to at least one of the trusted domains based on the comparison of the domain with one or more of the plurality of trusted domains;

determine a set of nameservers associated with the domain;

determine a set of nameservers associated with the at least one trusted domain that is similar but not identical to the domain;

determine if there is a match between the set of nameservers associated with the domain and the set of nameservers associated with the at least one trusted domain, wherein determining if there is a match between the set of nameservers associated with the domain and the set of nameservers associated with the at least one trusted domain comprises determining if the domain and the at least one trusted domain share a common set of nameservers; and flagging the domain as being legitimate or flag the domain as being illegitimate based on whether there is a match between the set of nameservers associated with the domain and the set of nameservers associated with the at least one trusted domain.

11. The method of claim 10, wherein the domain is associated with an undelivered message intended to be delivered to a recipient.

12. The method of claim 10, wherein the domain is associated with a received email message, and wherein the method flags the domain name as being legitimate and the email message as safe or flags the domain name as being illegitimate and the email message as potentially harmful based on whether there is a match between the set of nameservers associated with the domain and the set of nameservers associated with the at least one trusted domain.

13. The method of claim 12, wherein the domain is associated with a sender of the email message.

14. The method of claim 10, wherein determining that the domain is similar but not identical to at least one of the trusted domains based on the comparison of the domain with one or more of the plurality of trusted domains comprises:

determining that there is a positive level of resemblance between the domain and the one or more similar but not identical trusted domains of the plurality of trusted domains.

15. The method of claim 10, wherein the domain is an unrecognized domain associated with a website, and wherein the method flags the domain as being legitimate and the website as safe or flags the domain as being illegitimate and the website as potentially dangerous based on whether there is a match between the set of nameservers associated with the domain and the set of nameservers associated with the at least one trusted domain.

16. The method of claim 10, further comprising:

determining an identity of a registrar for the domain and an identity of a registrar for the at least one of the trusted domains that are similar but not identical to the domain from the at least one domain registration system;

comparing the identity of the registrar for the domain with the identity of the registrar for the at least one of the trusted domains that are similar but not identical to the domain; and flagging the domain as being legitimate or flag the domain as being illegitimate based on whether the identity of the registrar for the domain is the same as or different than the identity of the registrar for the at least one of the trusted domains that are similar but not identical to the domain.

17. The method of claim 10, further comprising:

determining an identity of a host for the domain and an identity of a host for the at least one of the trusted domains that are similar but not identical to the domain from the at least one domain registration system;

comparing the identity of the host for the domain with the identity of the host for the at least one of the trusted domains that are similar but not identical to the domain; and flagging the domain as being legitimate or flag the domain as being illegitimate based on whether the identity of the host for the domain is the same as or different than the identity of the host for the at least one of the trusted domains that are similar but not identical to the domain.

18. The method of claim 10, wherein at least one nameserver is a cloud nameserver.

* * * * *